Nov. 3, 1936.  C. C. FUERST  2,059,859
WINDING KEY FOR CAMERAS
Filed April 25, 1934
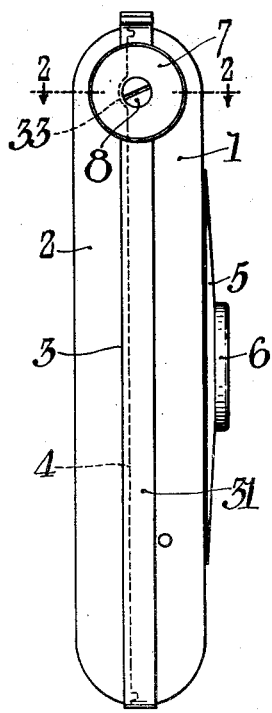
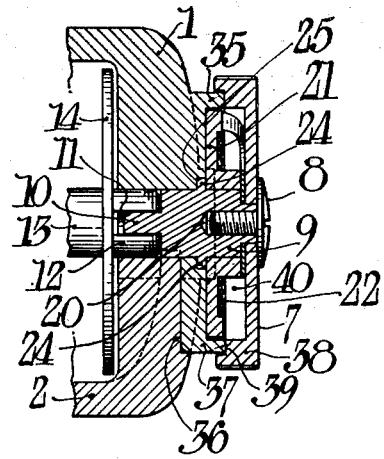
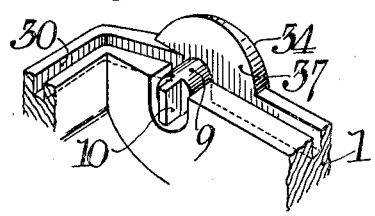
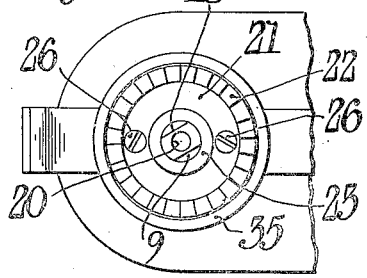
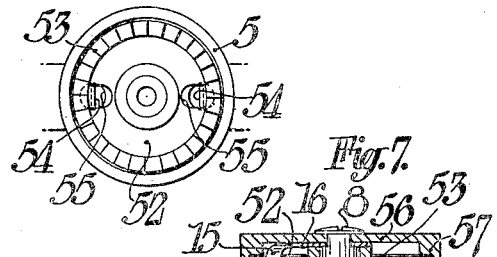
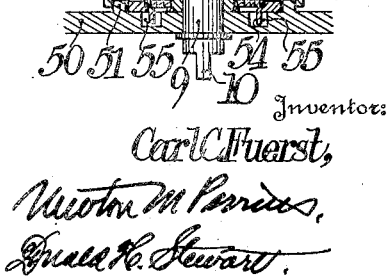
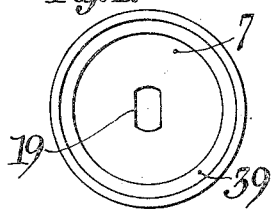
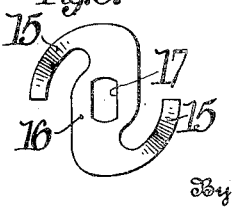
Inventor:
Carl C. Fuerst,
By
Attorneys Patented Nov. 3, 1936

2,059,859

UNITED STATES PATENT OFFICE 2,059,859

WINDING KEY FOR CAMERAS

Carl C. Fuerst, Rochester, N. Y., assignor, by mesne assignments, to Eastman Kodak Company, Jersey City, N. J., a corporation of New Jersey Application April 25, 1934, Serial No. 722,347

4 Claims. (Cl. 242—71)

This invention relates to photography, and more particularly to roll film cameras. One object of my invention is to provide a suitable winding key by which film may be wound on a spool in a camera. Another object of my invention is to provide a winding key, the construction of which is suitable for use on cameras made of moldable material. Another object of my invention is to provide a winding key which will make a perfectly light-tight joint with the camera and with the winding key shaft passing into the camera spool chamber. Another object of my invention is to provide a winding key having a shape adapted to cooperate with the shape of the camera body and the removable back for the camera body to form a light-tight joint therewith. Still another object of my invention is to provide a camera winding key which can be readily assembled from the outside of the camera and other objects will appear from the following specification, the novel features being particularly pointed out in the claims at the end thereof.

Coming now to the drawing wherein like reference characters denote like parts throughout;

Fig. 1 is a side elevation of a folded camera having a winding key constructed in accordance with and embodying a preferred form of my invention;

Fig. 2 is an enlarged fragmentary sectional view taken on the line 2—2 of Fig. 1;

Fig. 3 is an enlarged fragmentary end elevation of the winding mechanism with said parts removed;

Fig. 4 is a plan view of the inside of the winding knob;

Fig. 5 is a plan view of the spring pawl removed from the winding mechanism;

Fig. 6 is a fragmentary detail perspective view of a portion of the camera wall showing a portion of a slot which is engaged by a flange on the camera cover;

Fig. 7 is a sectional view through a modified form of film winding key; and

Fig. 8 is a plan view of the ratchet washer used in the modified form of my invention shown in Fig. 7.

As an example of my invention I have shown it as applied to a simple type of camera in which there is a camera body I which has a cover 2 removable from the body along the line 3, there being a flange 4 carried by the cover projecting into a corresponding groove in the camera body to make a light-tight joint therewith.

The camera body may be provided with a front board 5 carrying a lens cell 6, this front board being moved from the closed position shown in Fig. 1 to an opened or operative position as well known in the art.

The camera body I is provided with a winding mechanism which may consist of a winding knob 7 on the outside of the camera, this knob being attached by means of a screw 8 to a film winding shaft 9.

As is customary this shaft has some configuration adapted to engage a film spool. In the present instance this configuration consists of a web 10 adapted to extend into a slot 11 in the spool trunnion 12. This spool may be of a well known type in which the hub 13 carries flanges 14 and the spool trunnion 12 extends out beyond the flanges.

The winding key or knob 7 is arranged so that it may turn in only one direction. This is accomplished by providing, as indicated in Fig. 5, a pair of spring pawls 15 which are carried by a spring washer 16 having a non-round opening 17. This non-round opening engages the non-round end 18 of the film winding shaft 10 as is best shown in Fig. 3.

Referring to Fig. 4 it will be seen that the winding key 7 is also provided with a non-round opening 19 of the same configuration as the end of the shaft 18. When the openings 19 and 17 in the winding knob and spring washer are placed over the end 18 of the shaft, they may be held in this position by means of the screw 8 which is threaded to engage the threaded opening 20 in the film winding shaft 9. The spring pawls 15 are adapted to engage a ratchet washer best shown in Fig. 3 at 21. This washer is provided with teeth 22 about its periphery and is also provided with a central hub 23 adapted to engage the winding key shaft 9.

From Fig. 2 it will be noted that the winding key shaft is provided with an outwardly projecting flange 24 adapted to be received in a groove 25 which is formed in the camera and adapted to be held in this groove by means of the ratchet washer 21 which as shown in Fig. 3 may be definitely fastened to the camera body as by means of screws 26.

It will readily be seen that with this construction the winding key can be assembled from the outside of the camera by merely taking out the screws 8 and 26, the winding key shaft 9 will then pull directly out of the camera.

An important feature of my invention is the construction of the winding key which makes the camera entirely light-tight. As indicated in Fig. 6 the camera body 1 may be provided with a groove 30 which extends entirely around the camera body 1 so that it may be engaged by a flange 4 extending entirely around the camera back 2. The flange 4 on the camera back 2 may be notched as indicated in Fig. 1 at 33 to pass over the winding key shaft 9. However, at this point the light is well obstructed by the construction used. The camera body 1 is provided with a circular forming 34 which is preferably annular in shape and which is provided at 35 with an annular rim extending around its periphery as best shown in Fig. 3. Thus not only does the annular forming 34 lie over a portion of the camera back 2 but as shown in Fig. 2 there are inter-engaging walls 36 on the camera back end 37 of the forming which make a perfectly light-tight joint.

It should also be noticed that the winding knob 7 is provided with a downwardly extending flange 38 which is provided with a groove 39 adapted to lie close to or actually engage the upwardly extending annular flange 35 on the forming 34. This not only forms a run-way or track for guiding the winding key and preventing it from being bent out of shape but it also makes a light-tight joint for the hollow-box-like receptacle 40 which exists between the flange forming 34 and the winding key 7. Thus the parts of the winding mechanism, that is, the spring pawls 15 and the ratchet washer 21 are all tightly enclosed.

The construction of the entire winding key has been carefully designed to prevent light leakage down along the film winding shaft 9. The screw head 8 entirely lies over the joint between the winding key and the shaft 9 and in addition the flange 24 by projecting into the recess in the camera likewise prevents light from leaking through around the outside of the post.

Where the cost of a winding key must be reduced to a minimum, the structure shown as modified forms in Figs. 7 and 8 may be employed. In these views the camera wall 50 is provided with an annular flange 51 forming an opening into which the ratchet washer 52 may be placed. This washer has ratchet teeth 53 and may be held against turning by means of the lugs 54 which are struck from the metal of the washer 52 and are bent so that they extend down into apertures 55 formed in the camera wall 50. The spring pawl used in this construction may be exactly the same as that shown in Fig. 5.

The winding knob 56 may also be like the winding knob above described, the function of the flange 57 being identical with the function of the flange 38.

Having thus described my invention, what I claim as new and desire to secure by Letters Patent of the United States is:

1. In a film winding mechanism for cameras, the combination with a flanged, annular forming on a camera body having a central opening therein, of a shaft passing through said opening and supporting a flanged, annular knob with the flange lying close to the annular camera forming, a pawl carried by the shaft and inside of the annular winding knob, and a ratchet on the camera and adapted to be engaged by the pawl to prevent rotation of the winding knob in one direction.

2. In a film winding mechanism for cameras, the combination with a flanged, annular forming on a camera body having a central opening therein, of a shaft passing through said opening and supporting a flanged, annular knob with the flange lying close to the annular camera forming, a pawl carried by the shaft and inside of the annular winding knob, and a ratchet disk carried by the annular forming of the camera in position to be engaged by the pawl, whereby the annular formings enclose this mechanism for preventing rotation of the winding knob in one direction.

3. In a film winding mechanism for cameras, the combination with an annular, flanged camera part having a central aperture, of a film winding shaft extending through said aperture, a winding disk carried by the shaft, an annular flange on said disk projecting toward said camera flange and provided with a groove to partially enclose the flanged camera part forming a light-tight closure, cooperating elements carried by the film winding shaft and the camera adapted to prevent movement of the shaft in one direction, said elements being totally enclosed in said light-tight closure.

4. In a film winding mechanism for cameras, the combination with a curved outer camera wall having an annular forming with a central opening therein, said annular forming including annular plane surfaces at different elevations formed in the curved wall of the camera, of a shaft passing through said opening, an annular winding knob on one end of the shaft, annular configurations on the knob including annular plane surfaces at different elevations adapted to cooperate with the annular plane surfaces formed on the curved camera wall to form a substantially light-tight connection therewith, and means carried by the camera and the shaft passing through the camera wall, for preventing the winding knob from being turned in one direction.

CARL C. FUERST.